Dec. 15, 1970  E. H. SHORT III  3,546,940
TURBINE METER

Filed July 18, 1968  2 Sheets-Sheet 1

INVENTOR.
EDWARD H. SHORT III
BY
*Arthur L. Wade*
ATTORNEY

United States Patent Office 3,546,940
Patented Dec. 15, 1970

3,546,940
TURBINE METER
Edward H. Short III, Tulsa, Okla., assignor to Combustion Engineering, Inc., New York, N.Y., a corporation of Delaware
Filed July 18, 1968, Ser. No. 745,920
Int. Cl. G01f 1/10
U.S. Cl. 73—231                                    3 Claims

ABSTRACT OF THE DISCLOSURE

The rotor of a turbine meter is mounted in a housing bore to rotate on a shaft which extends axially along the bore from a support. The support is a post-like fixture extended from the wall of the bore. A collar on the shaft is engaged by a rotor structure to retain the rotor on the shaft and a bearing surface of the rotor engages the frustum-shaped end of the shaft extended from the fixture.

BACKGROUND OF THE INVENTION

Field of the invention

The present invention relates to mounting structures of turbine meters. More particularly, the invention relates to the bearing structure between the supported shaft and the rotor.

Description of the prior art

The rotors of turbine meters have been generally arranged to rotate on shafts supported to rotate in bearings at each end of the shaft. The bearings have frequently been mounted on centralizing structures uniformly arranged within the bore of a housing. Rather complex designs for these bearing supports have been developed, attempting to obtain a streamline effect that offers minimum resistance to the flowing fluid while providing mechanical stability to the bearing with which the shaft is engaged.

SUMMARY OF THE INVENTION

A principal object of the invention is to support the shaft of a turbine meter rotor on a post-like fixture extended from the wall of a passage in which the rotor is contacted by fluid flowing through the passage.

Another object is to provide a bearing between the rotor and the end of the shaft on which the rotor turns.

Another object is to provide a sleeve bearing between the shaft and the rotor and retention structure between the rotor and shaft.

Another object is to provide a method for mounting the rotor concentrically within the passage.

The present invention contemplates a simple housing for a turbine meter rotor with a cylindrical passage extended centrally therethrough. A post is mounted on the housing to extend from the internal wall of the passage as a support for a shaft for the rotor. After the post is mounted in position, the housing is rotated about the passage axis and a mounting hole formed in the internal end of the post for the shaft.

The invention also contemplates the shaft end being formed in a suitable shape to efficiently engage a bearing surface within the rotor. Sleeve bearings are also mounted within the rotor to engage the shaft along its length. Finally, a collar formation is provided about the shaft to engage a rotor structure to retain the rotor on the shaft.

Other objects, advantages and features of this invention will become apparent to one skilled in the art upon consideration of the written specification, appended claims, and attached drawings, wherein;

DESCRIPTION OF THE PREFERRED EMBODIMENT

The drawings disclose a turbine meter embodying the present invention with a simple, straight-forward technique. Essentially, the meter has a bladed rotor mounted to rotate on a shaft which extends along the axis of a housing bore. A pickup element is mounted on the housing to function in generating a magnetic field with lines of force arranged to be cut by the turning blades of the rotor.

Figure 1:
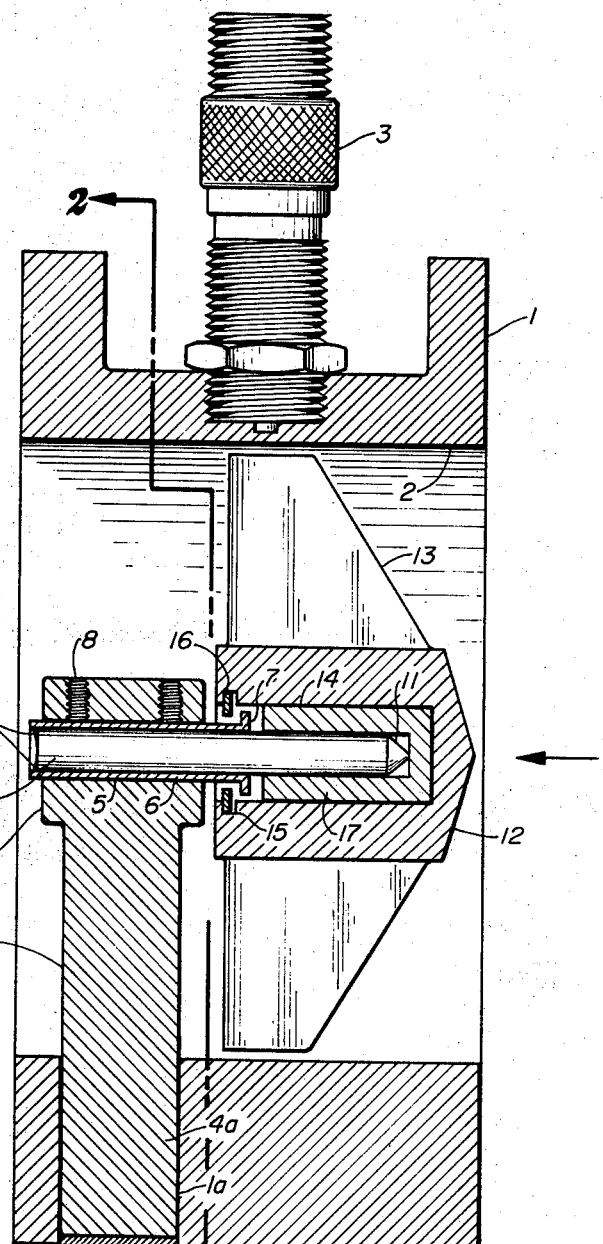
FIG. 1 is a sectioned elevation of a turbine meter and magnetic pickup device in which the present invention is embodied.
Figure 1A:
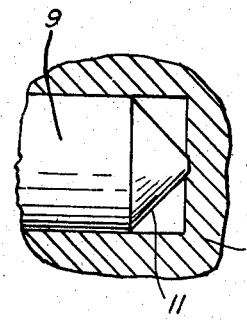
FIG. 1a is a magnification of the bearing surface formed between the end of the bearing shaft and the sleeve bearing of the rotor.

The structure disclosed in FIG. 1 provides a turbine meter of surprising economy of dimension, mass, and cost of manufacture. The unique method of mounting and boring the centralizing and supporting structure and the novel bearing structure disclosed and principal factors in bringing about this surprising economy. Furthermore, not only is mass reduced for a given size meter, but also mass increases proportionately less as meter size increases under the disclosed design than is presently experienced in this art.

The bearing arrangement also permits a unique method of construction to be carried out. The shaft support is roughly positioned within the housing bore; the bore of the support is then accurately machined along the longitudinal axis of the housing to accommodate the shaft for the rotor.

The structure, and its arrangement of the preferred embodiment, can be readily understood by specific reference to FIG. 1. The other figure is supplemental to the teaching of FIG. 1.

Housing 1 is a cylinder with an axial bore 2. A magnetic pickup unit 3 is a conventional device in general use on present turbine meters. The mounting of unit 3 conforms to present practice.

In the FIG. 1 embodiment, the turbine meter is provided with a housing formed to be included directly in a conduit transporting a flow stream desired to be measured. For example, the housing may fit between the two faces of a standard bolted flange.

A centralizing and supporting post 4 is radially mounted in the axial bore 2 of housing 1 of the turbine meter structure disclosed. The post 4 extends into bore 2 normal to the direction of flow of the measured stream.

Figure 2:
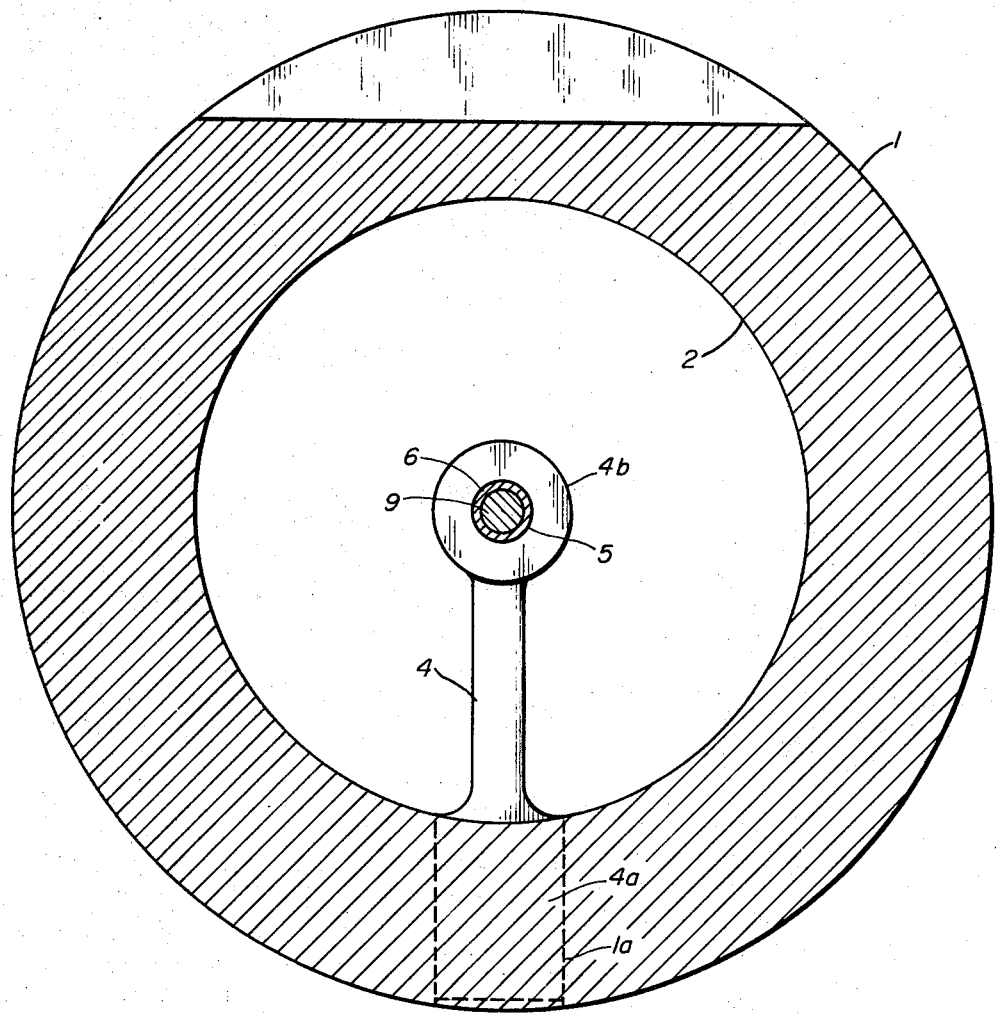
FIG. 2 is a section of FIG. 1 taken along lines 2—2.

Referring to FIG. 2, the centralizing and supporting structure embodied in this post 4 is formed with a much simplified and improved method of turbine meter manufacture. The structure offers a striking contrast to the complicated assemblies known in the art, and is readily recognized as an improvement over even the multiple-member supports. It provides simplicity of form, low cost of manufacture, ease of emplacement in the housing, and a much simplified bearing alignment procedure when fixing the bearing and rotor structure onto the housing.

It was also discovered that this structural arrangement of housing and bearing support permitted a unique method of centering the axial bore 5 around the axis of the housing 1. This bore 5 receives the fixed shaft portion of the rotor bearing structure.

Methods of centering a preformed bore of the support post in the housing that were used during the early developmental stage of this invention required very accurate machining of the well 1a in the housing 1, the base 4a of post 4 which will fit in well 1a, and the bore 5 in the head 4b of post 4. This accuracy was required to insure, prior to emplacement of post 4 in housing 1, that the axis of bore 5 would be collinear with the axis of housing 1.

The centering method disclosed permits a greatly facilitated manner of centering the bore 5. It also permits the well 1a and base 4a to be much less accurately sized, and allows casting in place of machining. This new method requires only that post 4 be set radially in the well in housing 1 and soldered or welded fast. Then the housing and post assembly are held in a lathe and rotated together about a boring bit prepositioned to be at the center of the circle described by the bore of the housing held in the lathe jaws. The bit is then urged through head 4b of post 4 to form bore 5.

Although bore 5 will seldom be centered in the head of post 4, this method of manufacture places bore 5 along the line of the housing axis with the great accuracy required, and the difficulty inherent in centering a bore along the axis of a housing after first drilling the bore in a separate element of the assembly is avoided.

Referring again to FIG. 1, the axially formed bore 5 has been fitted with sleeve 6. The sleeve includes the collar or rim structure 7 which cooperates with a retaining ring described below to hold the rotor in place during functioning of the turbine meter. The sleeve and collar thus serve the dual purpose of providing a very close tolerance seat for the bearing shaft and a manner of restricting the forward (countercurrent) travel of the turning rotor assembly.

Set screws 8 are used to fix sleeve 6 in place in center post 4. Their disclosure completes the description of this unique arrangement of the foundation components for the rotor and shaft elements of the meter.

A shaft 9 is now press-fitted into the bearing sleeve 6 and soldered fast at 10. Shaft 9 is provided with a frustum-shaped end 11 in its bearing section to further enhance its bearing characteristics. Specifically, it is observed that a shaft 9 of simple cylindrical shape imparts a tendency to the rotor to nutate in its rotation. This tendency is due to the very small though inevitable imperfections of fit between the extremely hard bearing surfaces, and is accentuated as bearing wear progresses. This eccentricity of rotation is greatly reduced by the frustum-shaped end 11 as the small diameter circle at its extreme tip laps in against the bearing surface opposite to it. Except in this small surface-to-surface contact area, almost no lapping or wearing-in is detected between the carbide alloy bearings employed in this structure. This feature, then, provides a point of wear necessary to efficient bearing operation. This embodiment of the invention not only stabilizes and so extends the life of the bearing structure and hence the meter itself, but also enhances and preserves the accuracy of the meter over its life.

Also disclosed in the embodiment of the invention is a rotor 12 with radial blades 13 so pitched as to cause the rotor to rotate when fluid flows through the meter. An axial bore 14 is drilled in the rotor and a circumferential groove 15 is cut in bore 14 normal to the axis of the rotor. Groove 15 receives a retaining ring shown in FIG. 1 as a split snap ring 16. Ring 16 functions to retain the rotor 12 and its parts on shaft 9 during rotation of rotor 12.

This disclosure of the invention is embodied in a turbine meter adaptable to operate in a vertical, as well as horizontal, line and to measure flow travelling against or with the forces of gravity. Even in horizontal lines, flow rate variations of the metered fluid are normal and inherent in turbine meter applications. These variations in turn cause fluctuations in the lateral force applied at the meter location in the flow line. It is apparent at this point both the need for and the manner in which the collar structure 7 machined integrally to sleeve 6 and the retaining ring 16 cooperate to retain the rotor on the shaft in the face of these forces.

A bearing sleeve 17, closed at its interior end, is ground and press-fitted into bore 14 of the rotor. It is the cylindrical interior surface of this sleeve in combination with the contact of its closed end with the small diameter circular tip of frustum 11 of shaft 9 that forms the bearing surface for rotor 12 as it turns about shaft 9.

The final assembly is consistent with the simplicity of design of this novel meter. Rotor 12 with sleeve 17 press-fitted in place is merely fitted on stationary shaft 9 until stopped by the tip of frustum 11 bearing against sleeve 17. Split ring 16 is compressed and fitted into place in groove 15 and assembly of the meter is completed. Fitting of the pickup head 3 and calibration of the meter render it ready for use. Providing the magnetic flux, cutting it with the rotating blades of the rotor, attaching the pickup head to a circuit, and translating the magnetic pulses onto a mechanical counter or other storage device is well known, not a part of the invention of the instant application, and not disclosed.

The usual method in the bearing alloy art is to provide one of the two members in a bearing structure with a softer material than the other, the sleeve or "bearing" usually being designed of the softer material to lap in on and prevent galling of the harder rod or shaft. Nonetheless, the practice in the turbine meter art which has been found to be most successful is to employ extremely hard alloys in both bearing and shaft. Thus, in the turbine meter disclosed, shaft 9 and bearing 17 are of a very hard abrasive-resistant material such as, for example, carbide alloy steel. This peculiar selection of bearing and shaft alloy employed in turbine meters illustrates, incidentally, the reason for forming sleeve 6 and collar 7 separately from shaft 9, and sleeve 17 separately from the hub of rotor 12. The formation of a collar such as that depicted at 7 about a carbide alloy shaft, for example, would be a much more time-consuming task than the method disclosed, and would cause unnecessary and uneconomical consumption of machine tools.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A turbine meter, having,
  a housing with a central bore adapted to be included in a conduit so that fluid flowing through the conduit will pass through the central bore,
  a support structure mounted on and extending from the bore wall to the axis of the bore,
  a shaft mounted on the support structure and extending axially along the bore,
  a rotor having a plurality of blades and journalled over the shaft,
  a bearing sleeve closed at one end and positioned between the rotor and shaft to form a bearing surface for the shaft surface and the end of the shaft during rotation of the rotor about the shaft,
  and a magnetic pickup structure mounted on the housing in a position whereby the rotating blades of the rotor will cut the lines of magnetic force generated by the pickup structure.

2. The meter of claim 1, wherein,
the shaft extended from the support structure has its end formed in a frustrum shape,
a rim structure is mounted about the shaft and is spaced from the support structure,
and a removable retaining ring structure is mounted on the rotor between the rim and support structure,
whereby the rotor is captured on the shaft by engagement of the shaft rim structure and the retaining ring structure as the rotor is rotated on the shaft.

3. The meter of claim 2, wherein,
the rotor is sized and arranged to preclude the rim structure engaging the sleeve bearing before the shaft tip engages the sleeve bearing.

References Cited

UNITED STATES PATENTS

| 3,342,070 | 9/1967 | Walch, Jr. | 73—231 |
| 3,433,071 | 3/1969 | Homrig | 73—231 |

FOREIGN PATENTS

| 1,119,422 | 7/1968 | Great Britain | 72—231 |

JAMES J. GILL, Primary Examiner

M. R. SMOLLA, Assistant Examiner

U.S. Cl. X.R.

73—229